US009037280B2

(12) United States Patent
Dishner et al.

(10) Patent No.: US 9,037,280 B2
(45) Date of Patent: May 19, 2015

(54) COMPUTER-IMPLEMENTED METHODS FOR PERFORMING ONE OR MORE DEFECT-RELATED FUNCTIONS

(75) Inventors: Mark Dishner, Lake Oswego, OR (US); Chris W. Lee, Fremont, CA (US); Sharon McCauley, San Jose, CA (US); Patrick Huet, San Jose, CA (US); David Wang, Sunnyvale, CA (US)

(73) Assignee: KLA-Tencor Technologies Corp., Milpitas, CA (US)

( * ) Notice: Subject to any disclaimer, the term of this patent is extended or adjusted under 35 U.S.C. 154(b) by 869 days.

(21) Appl. No.: 11/146,342

(22) Filed: Jun. 6, 2005

(65) Prior Publication Data

US 2006/0287751 A1 Dec. 21, 2006

(51) Int. Cl.
*G06F 19/00* (2011.01)
*G05B 23/02* (2006.01)

(52) U.S. Cl.
CPC .................................. *G05B 23/0221* (2013.01)

(58) Field of Classification Search
USPC ................ 700/108–111, 121; 702/35, 58, 14; 382/149, 146, 144; 356/73, 137.5
See application file for complete search history.

(56) References Cited

U.S. PATENT DOCUMENTS

| | | | |
|---|---|---|---|
| 5,544,256 A * | 8/1996 | Brecher et al. ................. | 382/149 |
| 5,991,699 A | 11/1999 | Kulkarni et al. | |
| 6,445,199 B1 * | 9/2002 | Satya et al. ..................... | 324/753 |
| 6,483,938 B1 * | 11/2002 | Hennessey et al. ............ | 382/149 |
| 6,553,323 B1 | 4/2003 | Obara et al. | |
| 6,718,526 B1 | 4/2004 | Eldredge et al. | |
| 7,171,038 B2 * | 1/2007 | Adler et al. .................... | 382/149 |
| 7,274,444 B2 * | 9/2007 | Furman et al. ............. | 356/237.2 |
| 7,295,695 B1 * | 11/2007 | Dayal ............................ | 382/145 |
| 2003/0025904 A1 | 2/2003 | Sakai et al. | |
| 2003/0050761 A1 | 3/2003 | Okabe et al. | |

(Continued)

FOREIGN PATENT DOCUMENTS

| | | |
|---|---|---|
| EP | 0 910 123 | 4/1999 |
| JP | 2001-85483 | 3/2001 |

(Continued)

OTHER PUBLICATIONS

Notice of the Reason for Refusal for Japanese Patent Application No. 2008-515840 mailed Jul. 19, 2011.

(Continued)

*Primary Examiner* — Kidest Bahta
(74) *Attorney, Agent, or Firm* — Ann Marie Mewherter

(57) ABSTRACT

Computer-implemented methods for performing one or more defect-related functions are provided. One method for identifying noise in inspection data includes identifying events detected in a number of sets of inspection data that is less than a predetermined number as noise. One method for binning defects includes binning the defects into groups based on defect characteristics and the sets of the inspection data in which the defects were detected. One method for selecting defects for defect analysis includes binning defects into group (s) based on proximity of the defects to each other and spatial signatures formed by the group(s). A different method for selecting defects for defect analysis includes selecting defects having the greatest diversity of defect characteristic(s) for defect analysis. One method includes classifying defects on a specimen using inspection data generated for the specimen combined with defect review data generated for the specimen.

46 Claims, 2 Drawing Sheets

(56) References Cited

U.S. PATENT DOCUMENTS

| | | | |
|---|---|---|---|
| 2003/0130806 A1* | 7/2003 | Mizuno et al. | 702/35 |
| 2004/0091142 A1* | 5/2004 | Peterson et al. | 382/144 |
| 2004/0223639 A1 | 11/2004 | Sato | |
| 2004/0228515 A1* | 11/2004 | Okabe et al. | 382/145 |
| 2005/0004774 A1* | 1/2005 | Volk et al. | 702/108 |
| 2005/0037272 A1 | 2/2005 | Tanaka | |
| 2005/0062963 A1* | 3/2005 | Yoshida et al. | 356/237.5 |
| 2005/0210423 A1* | 9/2005 | Liao et al. | 716/4 |
| 2005/0288893 A1* | 12/2005 | Gassner | 702/182 |

FOREIGN PATENT DOCUMENTS

| | | |
|---|---|---|
| JP | 3255292 | 11/2001 |
| JP | 2002-303586 | 10/2002 |
| JP | 2003-86645 | 3/2003 |
| JP | 2004-281681 | 10/2004 |
| JP | 2005-507557 | 3/2005 |
| WO | 02/095802 | 11/2002 |
| WO | 03/077291 | 9/2003 |
| WO | 2004/097903 | 11/2004 |

OTHER PUBLICATIONS

Notice of the Reason for Refusal for Japanese Patent Application No. 2008-515840 mailed Oct. 9, 2012.

Notice of the Reason for Refusal for Japanese Patent Application No. 2011-229550 mailed Jul. 9, 2013.

Notice of the Reason for Refusal for Japanese Patent Application No. 2011-229550 mailed Feb. 18, 2014.

International Search Report for PCT/US2006/022005 mailed Sep. 24, 2007.

International Preliminary Report on Patentability for PCT/US2006/022005 mailed Dec. 21, 2007 (containing the Written Opinion for PCT/US2006/022005 mailed Sep. 24, 2007).

* cited by examiner

COMPUTER-IMPLEMENTED METHODS FOR PERFORMING ONE OR MORE DEFECT-RELATED FUNCTIONS

BACKGROUND OF THE INVENTION

1. Field of the Invention

This invention generally relates to computer-implemented methods for performing one or more defect-related functions. Certain embodiments relate to computer-implemented methods for identifying noise in inspection data, binning defects, selecting defects for defect analysis, selecting one or more parameters of a defect review process, or classifying defects.

2. Description of the Related Art

The following description and examples are not admitted to be prior art by virtue of their inclusion in this section.

Inspection processes are used at various times during a semiconductor manufacturing process to detect defects on a specimen such as a reticle and a wafer. Inspection processes have always been an important part of fabricating semiconductor devices such as integrated circuits. However, as the dimensions of semiconductor devices decrease, inspection processes become even more important to the successful manufacture of acceptable semiconductor devices. For instance, as the dimensions of semiconductor devices decrease, detection of defects of decreasing size has become necessary since even relatively small defects may cause unwanted aberrations in the semiconductor devices.

Inspection for many different types of defects has also become more important recently. For instance, in order to use the inspection results to monitor and correct semiconductor fabrication processes, it is often necessary to know what types of defects are present on a specimen. In addition, since controlling every process involved in semiconductor manufacturing is desirable to attain the highest yield possible, it is desirable to have the capability to detect the different types of defects that may result from many different semiconductor processes. The different types of defects that are to be detected may vary dramatically in their characteristics. For example, defects that may be desirable to detect during a semiconductor manufacturing process may include thickness variations, particulate defects, scratches, pattern defects such as missing pattern features or incorrectly sized pattern features, and many others having such disparate characteristics.

In order for inspection to provide useful results for yield control, the inspection process must be able to not only detect many different kinds of defects but also to discriminate between real defects on the wafer or reticle and noise or nuisance events. Noise may be defined as events detected on a wafer or reticle by an inspection tool that are not actually defects but appear as potential defects due to marginalities in the inspection tool such as marginalities in data processing and/or data acquisition. Nuisance events are actual defects but that are not relevant to the user for the purposes of controlling the process or predicting yield. Moreover, the same defect may be considered as a nuisance event at one point in time, but it may later be found to be a relevant defect. In some instances, the number of noise and nuisance events detected by an inspection tool can be reduced by using optimized data acquisition parameters and optimized data processing parameters. In addition, the number of noise and nuisance events can be reduced by applying various filtering techniques to the inspection results.

One problem associated with noise and nuisance event reduction by the above method is the difficult and time consuming nature of determining the data acquisition and data processing parameters that will minimize noise and nuisance events. In particular, determining the appropriate data acquisition and data processing parameters typically involves a significant amount of time. In addition, the task of setting up an inspection process for a particular specimen and a specific defect type of interest may be particularly difficult when an inspection system has a relatively large number of adjustable data acquisition and data processing parameters. Furthermore, it may be impossible to know whether the best inspection process has been found unless all possible combinations of the data acquisition and data processing parameters have been tested.

However, most inspection processes are currently set up using a large number of manual processes (e.g., manually setting the data acquisition parameters, manually analyzing the resulting inspection data, etc.). As such, setting up the inspection process may take a relatively long time. Furthermore, depending on the types of specimens that will be inspected with the inspection system, a different inspection process may need to be set up for each different type of defect. The length of time involved in determining appropriate data acquisition and data processing parameters may be particularly problematic for cases such as a short experiment in development or a ramp for a short device-run in a foundry since these inspection processes do not provide a good return on the effort involved in setting them up.

Another important part of yield control is determining the cause of the defects on the wafer or reticle such that the cause of the defects can be corrected to thereby reduce the number of defects on other wafers or reticles. Often, determining the cause of the defects involves identifying the defect type and other characteristics of the defects such as size, shape, composition, etc. Since inspection typically only involves detecting defects on the wafer or reticle and providing limited information about the defects such as location, number, and sometimes size, defect review is often used to determine more information about individual defects than that which can be determined from inspection results. For instance, a defect review tool may be used to revisit defects detected on a wafer or reticle and to examine the defects further in some manner either automatically or manually. Defect review can also be used to verify that defects detected by inspection are actual defects instead of, for example, noise and nuisance events.

Some examples of commonly used defect review tools include high resolution optical imaging systems, scanning electron microscopes and less commonly transmission electron microscopes. Often, the tools used for defect review have a much lower throughput than inspection tools and can have negative effects on the material. Therefore, judicious use of the defect review tool is essential to provide sufficient information about defects on a reticle or wafer without significantly affecting the overall throughput of the process. One way in which the effect of defect review on the overall process throughput is mitigated is by reviewing only a subset or a portion of all of the defects that were detected by inspection.

Selecting defects for review is often called "sampling." Although sampling defects for review is one primary way to improve the throughput of defect review, there are many ways in which sampling can adversely affect the information about defects generated by review. For example, one common way to sample defects for review is by random sampling of the entire defect population detected by inspection. In some instances, random sampling is effective to select a suitable defect subpopulation for review. However, there are many situations in which a random sample may not be desirable. For instance, real defects may be positioned randomly on a wafer that the user wants to be in the subpopulation for review for trending purposes, but these defects may dominate the population. Therefore, too few of the other types of defects may appear in a random sample to provide a defect subpopulation that is effective for review of all defect types of the wafer.

The effectiveness of the defect review process is also determined by the data acquisition parameters and/or data processing parameters used. In particular, much like inspection processes as described above, the data acquisition parameters and data processing parameters of a defect review process will have a profound effect on the defect review results. Therefore, it is important that defect review processes be performed with parameters that are suitable for the types of defects being reviewed. Like determining the appropriate parameters for inspection, determining the appropriate parameters for review can be relatively time consuming and difficult particularly when the defect review tool has a large number of adjustable parameters and/or a large number of different defects are to be reviewed in a single process. As such, it is conceivable that many defect review processes are currently being performed with parameters that are substantially less than optimal for at least some of the defects being reviewed.

Accordingly, it may be advantageous to develop computer-implemented methods for identifying noise in inspection data, binning defects, selecting defects for defect analysis, selecting one or more parameters of a defect review process, and/or classifying defects that provide higher throughput and better performance than currently available methods.

SUMMARY OF THE INVENTION

The following description of various embodiments of computer-implemented methods is not to be construed in any way as limiting the subject matter of the appended claims.

One embodiment relates to a computer-implemented method for identifying noise in inspection data. The method includes detecting events in sets of inspection data using detection parameters known to detect noise, nuisance events, and real events. The sets of inspection data are generated by different inspections performed on a specimen. The method also includes identifying the events detected in a number of the sets of inspection data that is less than a predetermined number as noise. In one embodiment, the method includes eliminating the events identified as noise from the sets of inspection data.

In one embodiment, the different inspections are performed with the same or different data acquisition conditions. In another embodiment, the different inspections are performed with the same or different detection parameters. Each of the embodiments of the method described above may include any other step(s) described herein.

Another embodiment relates to a computer-implemented method for binning defects. The method includes determining characteristics of defects detected in sets of inspection data generated by different inspections performed on a specimen. The method also includes binning the defects into groups based on the characteristics and the sets of the inspection data in which the defects were detected.

In one embodiment, the method includes sampling the defects in the groups for defect review. In another embodiment, the different inspections are performed with the same data acquisition parameters, and the defects are detected in the sets of inspection data using the same detection parameters. In a different embodiment, the different inspections are performed with different data acquisition parameters. In an additional embodiment, the defects are detected in the sets of inspection data using different detection parameters. In a further embodiment, the different inspections are performed with different data acquisition parameters, and the defects are detected in the sets of inspection data using different detection parameters. In yet another embodiment, the defects are detected with a single set of inspection parameters. In one such embodiment, the method also includes determining additional characteristics of the defects using data generated by an additional inspection performed on the specimen with data acquisition parameters different than data acquisition parameters of the single set. Each of the embodiments of the method described above may include any other step(s) described herein.

An additional embodiment relates to a computer-implemented method for selecting defects for defect analysis on an inspection system. This method includes binning defects into one or more groups based on the proximity or the relative position of the defects to each other on a specimen and spatial signatures formed by the one or more groups. This technique has been called spatial signature analysis of the defects. Each group formed in this analysis is called a signature and may be labeled (e.g., with a tag) indicating the kind of signature such as a scratch, an annular ring or a radial mark. All of the defects on the wafer may be marked as a member of one or more signatures or as a random event. The method also includes selecting one or more of the defects in at least one of the one or more groups (e.g., any or all of the signatures thus formed) for defect analysis.

In one embodiment, the defects analysis includes creating a sample for defect review. In a different embodiment, the defect analysis includes defect classification. In another embodiment, the defect analysis includes summary reporting of the results of the binning step. For example, the defect analysis may include creating a report on results of the binning step. The term "report" is used herein to encompass reports that would be presented on the system user interface, reports filed on the system's long term storage, reports sent using Semiconductor Equipment Communications Standards to a host or other system, and reports sent via e-mail or other standard for communication.

In one embodiment, the binning step is performed at the end of inspection on data generated by inspection. In additional embodiments, the binning step is performed prior to optical review on a review system or electron microscope review on a microscope. In a different embodiment, the binning step is performed on data generated by inspection, but it is performed on an optical review system in order to form a sample for automatic or manual review. In other embodiments, the binning step is performed on data generated by inspection, but it is performed on a scanning electron microscope review system in order to form a sample for automatic or manual review.

In another embodiment, the binning step may include stacking the inspection data into areas on a specimen. The areas include the same patterned feature design such as a die or an area formed in a single exposure of the reticle on the wafer. The defects are then analyzed by their relative position by spatial signature analysis of the entire wafer.

In some embodiments, the method includes determining how many of the defects in the one or more groups (e.g., signature groups and random groups) are to be selected for the defect analysis. The number of defects in the one or more groups may be determined based on the label of the signature and the count of the defects therein. In another embodiment, the method includes determining if the any of the one or more groups (e.g., signature or signatures) is associated with a known root cause. In an additional embodiment, the method includes associating results of the defect analysis with the groups into which the defects were binned. Each of the embodiments of the method described above may include any other step(s) described herein.

A further embodiment relates to a different computer-implemented method for selecting defects for defect analysis. This method includes determining one or more characteristics of defects detected on a specimen. The method also includes selecting the defects having the greatest diversity of the one or more characteristics for defect analysis. The method may include any other step(s) described herein.

Another embodiment relates to a computer-implemented method for selecting one or more parameters of a defect review process. The method includes determining one or more characteristics of defects selected for defect review. The method also includes selecting one or more parameters of a process for the defect review based on the one or more characteristics such that different types of the defects can be reviewed with one or more different parameters.

In one embodiment, the one or more parameters include one or more data acquisition parameters. In another embodiment, the one or more parameters include one or more data processing parameters. In some embodiments, the method may include selecting one or more sampling parameters for one or more of the defect types based on the one or more characteristics. Each of the embodiments of the method described above may include any other step(s) described herein.

Yet another embodiment relates to a computer-implemented method for classifying defects that includes classifying defects on a specimen using inspection data generated for the specimen combined with defect review data generated for the specimen. In one embodiment, the inspection data includes raw inspection data. In another embodiment, classifying the defects is performed using a defect attributes based method or a feature vector based method. In an additional embodiment, classifying the defects includes automatic defect classification.

In one embodiment, the defect review data includes scanning electron microscope images. In another embodiment, the inspection data used for classifying the defects includes contextual information about the defects. In a further embodiment, the inspection data is generated with different data acquisition parameters. In an additional embodiment, the defect review data is generated with different data acquisition parameters. Each of the embodiments of the method described above may include any other step(s) described herein.

BRIEF DESCRIPTION OF THE DRAWINGS

Other objects and advantages of the invention will become apparent upon reading the following detailed description and upon reference to the accompanying drawings in which.

Figure 1:
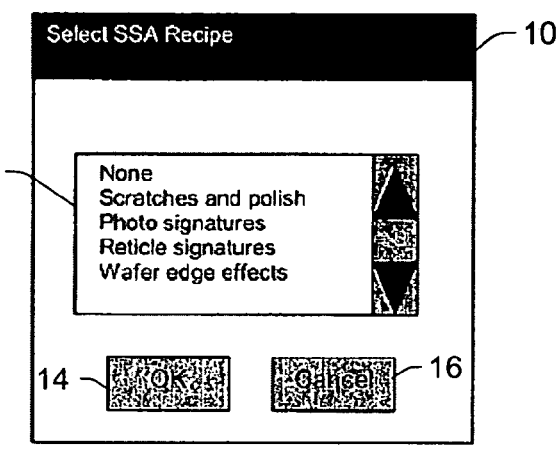
FIG. 1 is a screenshot illustrating one example of a user interface that can be used to select one or more spatial signature analysis processes to be used in an embodiment of a computer-implemented method described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "defect" generally refers to any abnormality or undesirable feature that may be formed on or within a wafer.

As used herein, the term "specimen" refers to a reticle or a wafer. The terms "reticle" and "mask" are used interchangeably herein. A reticle generally includes a transparent substrate such as glass, borosilicate glass, and fused silica having patterned regions of opaque material formed thereon. The opaque regions may be replaced by regions etched into the transparent substrate. Many different types of reticles are known in the art, and the term reticle as used herein is intended to encompass all types of reticles.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities. A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable pattern features. Formation and processing of such layers of material may ultimately result in completed semiconductor devices. As such, a wafer may include a substrate on which not all layers of a complete semiconductor device have been formed or a substrate on which all layers of a complete semiconductor device have been formed.

The wafer may further include at least a portion of an integrated circuit, a thin-film head die, a micro-electro-mechanical system (MEMS) device, flat panel displays, magnetic heads, magnetic and optical storage media, other components that may include photonics and optoelectronic devices such as lasers, waveguides and other passive components processed on wafers, print heads, and bio-chip devices processed on wafers.

Although some embodiments are described herein with respect to wafers, it is to be understood that all of the embodiments described herein may be used for any of the specimens described above.

The terms "parameters," "settings," and "conditions" are used interchangeably herein to refer to a variable of a process such as inspection and review.

As described in U.S. patent application Ser. No. 60/618, 475 filed Oct. 12, 2004, by Teh et al., which is incorporated by reference as if fully set forth herein, current systems configured for inspection of semiconductor wafers detect more "events" on the wafers than can be effectively reviewed or analyzed without filtering and binning them. An "event" as used herein generally refers to any potential defect identified by an inspection system. An event may actually represent noise, a nuisance event, or a real defect event. As studies have shown, the most time consuming part of many inspection sequences is the time it takes to review and classify the inspection results. The embodiments of the computer-implemented methods described herein provide improved methods for inspection and analysis that can be performed by an appropriately configured inspection system, review system, computer system, or some combination thereof to improve, and even optimize, overall throughput and performance.

Currently, many different strategies can be used for elimination of noise and nuisance events. Some of these strategies involve setting the parameters of the data acquisition hardware to appropriate values or states for optimal detection, and various algorithms are applied to isolate nuisance events. One disadvantage of these methods is that they take a substantial amount of time to set up the "recipe" or process for inspection. Therefore, for some cases, such as a short experiment in development or a production ramp for a short device-run in a foundry, these methods do not provide a good return on the effort involved in setting them up. A method that involves some extra inspection to provide more inspection data and performing the nuisance event isolation automatically would provide an improvement over current methods even with the extra time needed for inspection. For instance, the method can be performed with a less than optimized inspection process thereby improving the overall throughput of the inspection process by reducing, or even eliminating, the time involved in determining a set of optimal optical inspection parameters. In addition, by processing the data as described further herein, the results of a less than optimized inspection process can be used to differentiate between nuisance and real events with relatively good accuracy.

Accordingly, one embodiment of a computer-implemented method for identifying noise in inspection data includes detecting events in sets of inspection data using detection parameters known to detect noise, nuisance events, and real events. In other words, event detection is performed with data processing parameters that have not been optimized. For example, the inspection may be performed with data processing parameters (e.g., algorithm settings) that are known to likely detect noise or nuisance events in addition to real events.

The sets of inspection data are generated by different inspections performed on a specimen. The different inspections may be performed in different "passes" or different "tests" of a single inspection process. The different inspections may use the same or different non-optimized inspection parameters. For instance, the different inspections may be performed with the same or different data acquisition conditions. In addition, the different inspections may be performed with the same or different detection parameters.

The method also includes identifying the events detected in a number of the sets of inspection data that is less than a predetermined number as noise. In addition, or alternatively, the method may include identifying the events that are not detected in a particular combination of the sets of inspection data as nuisance events. In this manner, the methods described herein take advantage of the fact that, in general, noise and nuisance events will be less repeatable than real events. In some embodiments, the method includes eliminating the events identified as noise or nuisance events from the sets of inspection data.

The computer-implemented method embodiments described above, therefore, provide a method for reducing the number of noise and nuisance events in inspection data through a stability (repeatability) check on the results, achieved through repeated inspection. In other words, the method may include multiple inspection passes for the purpose of automatically removing the events that are not found a sufficient number of times. The multiple inspection passes may be performed as described further herein.

A recipe for the method preferably includes variable parameters that can be used to indicate the number of times that the inspection is to be performed and the repeatability criterion that is to be used to determine real from nuisance events. The recipe may also include data processing (e.g., an algorithm) that is performed after the inspection passes are complete. The data processing may automatically remove the events that were not detected the predetermined number of times in the inspection data. For cases in which different inspection parameters are used in the inspections, the recipe may also include criteria for determining whether a defect is real using not only the number of times it was detected, but also the number of different inspection settings under which it was detected.

The methods described herein for identifying noise and/or nuisance events in inspection data have a number of advantages over the currently used methods. For instance, the inspection process or system can be configured for highly sensitive detection performance (e.g., detecting every potential event) while avoiding nuisance events. Since inspection of the specimen is performed a number of times, the method will not have a relatively high throughput. However, for inspections that will only be used a small number of times in a development, ramp, or foundry environment, the overall throughput of both inspection process setup and inspection process run can be optimized while maintaining high sensitivity. Each of the embodiments of the method described above may include any other step(s) described herein.

There are also many existing methods for binning defects. In general, the existing strategies consider a single population with characteristics generated in a common way. To use inspection data generated in multiple passes, a series of discrete binning operations may be performed for each population. A method that combines inspection data generated in various ways would provide a greater benefit for binning in some cases. For instance, certain defect types are found using one imaging mode or algorithm condition, whereas other types are found with another, whereas still other types are found using both. In another case, the characteristics of certain defect types will change in relatively predictable ways under different image acquisition conditions or algorithm settings. By combining the results of multiple tests or one or more rescans of the detected defects from one test for use in a single binning process, including information on which conditions resulted in detection of the defect and the characteristics of the defect under those conditions, the defects can be binned more effectively for the purposes of sampling for review, and particularly scanning electron microscope (SEM) review.

One embodiment of a computer-implemented method for binning defects includes determining characteristics of defects detected in sets of inspection data generated by different inspections performed on a specimen. The method also includes binning the defects into groups based on the characteristics of the defects and the sets of the inspection data in which the defects were detected. For example, the data acquisition and/or processing parameters associated with the set of inspection data in which a defect is found may be used as input to the binning process. In one embodiment, the method includes sampling defects in the groups for defect review.

The computer-implemented method embodiments described above, therefore, provide a method for combining the results of multiple inspection passes for the purposes of gathering additional information on the event population to enhance binning and sampling. In other words, the multiple inspection passes generate multiple sets of inspection data about the events that can be used for binning and sample generation.

In another embodiment, the different inspections are performed with the same data acquisition parameters, and the defects are detected in the sets of inspection data using the same detection parameters. In a different embodiment, the different inspections are performed with different data acquisition parameters. In other embodiments, the defects are detected in the sets of inspection data using different detection parameters. In some embodiments, the different inspections are performed with different data acquisition parameters, and the defects are detected in the sets of inspection data using different detection parameters.

In yet another embodiment, the defects are detected with a single set of inspection parameters (e.g., one set of data acquisition and detection parameters), and the defective sites are rescanned in different conditions solely for the purpose of acquiring additional characteristics for the purpose of binning or analysis. In this manner, the method may include determining additional characteristics of the defects using data generated by an additional inspection performed on the specimen with data acquisition parameters that are different than data acquisition parameters of the single set.

In this manner, the passes may be performed with the same hardware and/or software settings. Alternatively, the passes may be performed with different hardware and/or software settings. A user may create an inspection process that includes multiple passes. These passes will fall into one of the following groups: all passes using the same imaging conditions and detection algorithms; some passes using different algorithms; some passes using different imaging conditions; and some passes using different algorithms and imaging conditions.

Upon completion of the inspection passes, an algorithm would run that would determine which pass or passes caught the defect and the defect's characteristics in those passes, which can then be used to bin the defect into two or more groups that would be sampled for SEM review. The computer-implemented method embodiments described above, therefore, have several advantages over currently used binning methods. For example, the SEM review sample will have a better representation of the defects by sampling of defects binned in this manner. Each of the embodiments of the computer-implemented method described above for binning defects may include any other step(s) described herein.

As is generally known by persons familiar with statistics, for most situations in which one cannot revisit the full population and, therefore, sampling is required, the easiest and best method to review a representative sample is to generate a random sample of the population. The results of this method are relatively easy to project back to the population as a whole using the fewest examples overall. As a result, the most common review strategy in wafer inspection is some form of random sampling, sometimes enhanced in various ways.

However, there are many situations in which a random sample is not desirable. For instance, real defects may be positioned randomly on the wafer, and the user may want these defects to be in the review population for trending purposes, but these defects can dominate the population. As such, too few of the other types of defects will appear in the random sample. In another example, there may be critically important defects that are relatively few in number. Therefore, the likelihood of these defects being included in a random sample is substantially small.

For the two situations described above, it can be useful to bin the defects into groups and then sample some or all of the bins, either proportionally or non-proportionally. In this manner, the number of defects sampled in each bin may be different and determined independently. Upon completion of the review and/or classification, the results and/or classifications are preferably matched with the binning criteria instead of being projected back to the population as a whole as is currently performed. As may be expected, more samples may be used for these methods than in random sampling to avoid sampling error, particularly if the number of bins used to separate the defects is relatively high. This type of sampling is supported today in sampling used in Klarity products, which are commercially available from KLA-Tencor, San Jose, Calif., and also in other analysis systems. This type of sampling is also supported on inspection tools including the AIT XP+ series of tools that are also available from KLA-Tencor. One issue with this method is that the analysis is heavily dependent on knowledge of the sampling method. In this manner, information about the sampling needs to "travel" with the defect data to all analysis locations.

In an additional example, there may be real events that come from a single cause and that are grouped together on the wafer or that form a pattern or signature from a wafer, reticle, or die perspective. Some signature types may be well understood, and there is no need to review them. Other defect signatures may not be well understood or may come from more than one cause that can be determined by review. Although it may be desirable, or even critical, to review such defects in the sample, only one or two examples of such defects may be desired.

For the above-described situation, the current methodology involves performing a clustering algorithm and treating the clustered and unclustered defects as two populations for the purposes of sampling. One of the deficiencies of this method is that simple clustering does not recognize disjoint events such as scratches and coat spikes as single "signatures." Similarly, it cannot recognize diffuse groups of defects (sometimes called a cloud or haze) as signatures without misidentifying other unclustered events as clusters. These signatures can be recognized and classified by the spatial signature analysis (SSA) algorithm, which is an option in Klarity Defect. Examples of the SSA algorithm and methodology are illustrated in commonly assigned U.S. Pat. No. 5,992,699 to Kulkarni et al. and U.S. Pat. No. 6,718,526 to Eldredge et al., which are incorporated by reference as if fully set forth herein. SSA used in the methods described herein can be performed as described in these patents.

In yet another example, the population may be unknown such as in a research facility or during production ramp when process problems are not well understood. The interest in these situations is seeing a wide variety of defects, and there is generally not a strong need to project back to the population as a whole. This situation is generally poorly handled today. For instance, for manual review and analysis, users can work from wafer maps, die maps, simple grouping algorithms and intuition to manually finding interesting defects for review. In addition, a method can be used to find a diverse sample of defects, which can be used for manually finding defects of interest for the purposes of determining the ideal inspection settings, as described in commonly assigned U.S. patent Ser. No. 11/125,429 filed May 10, 2005 by Wang et al., which is incorporated by reference as if fully set forth herein. The methods described herein may use a diverse sampling strategy to perform sampling automatically in inspection to support the ramp and engineering analysis use cases. There are no other known automated sampling systems or methods for finding the widest possible variety of defect types in production runs of wafer inspection systems.

One embodiment of a computer-implemented method for selecting defects for defect analysis includes binning defects into one or more groups based on proximity of defects to each other on a specimen and spatial signatures formed by the one or more groups. The method also includes selecting one or more of the defects in at least one of the one or more groups for defect analysis. In other words, defects in each group may be independently sampled such that at least some defects in each group are reviewed. In one embodiment, the defect analysis includes creating a sample for defect review. In another embodiment, the defect analysis includes defect classification. In some embodiments, the defect analysis includes creating a report on results of the binning step. In this manner, the analysis may include creating a summary report on the SSA results. The embodiments of the methods described herein provide a method for reducing and segmenting the population of defects that is sampled for post-inspection image gathering and classification through effective handling of various types of event signatures.

In one embodiment, the binning step is performed on data generated by inspection. In this manner, the method may involve using automatic SSA results on a wafer inspection system. In addition, the binning step may be performed prior to optical review or scanning electron microscope review.

For SSA to be available for sampling and other analysis on-tool, the user can select one or more SSA recipes to be part of the inspection recipe. One possible interface that can be used to provide this capability is shown in FIG. 1. In particular, FIG. 1 is a screenshot that illustrates one example of a user interface that can be used to allow the user to select one or more SSA processes to be used in an embodiment of a computer-implemented method described herein. It is noted that all of the screenshots that are illustrated and described herein are merely presented as examples of user interfaces that can be used to implement the methods described herein to further understanding of the methods. Obviously, many different configurations for the user interfaces are possible, and all such configurations are within the scope of the present disclosure.

As shown in FIG. 1, Select SSA Recipe user interface 10 includes a list of SSA methods available for use for sampling and other on-tool analysis. In this example, list 12 displays options that include: None; Scratches and polish; Photo signatures; Reticle signatures; and Wafer edge effects. However, the list may include some of these options, some of these options with other options, or an entirely different set of options. After selecting one or more of the options in list 12 (e.g., by clicking on the names of one or more SSA options), the user may select OK 14 or Cancel 16 to proceed with the method.

In some embodiments, SSA includes stacking inspection data corresponding to multiple areas on a specimen. The areas include the same patterned feature design. In other words, the areas may be fields or dies on the specimen. Such an embodiment also includes determining if the defects located in the stacked area substantially form a signature.

As described above, therefore, the method may use SSA in on-tool analysis to work from defects in a reticle stack or die stack and cluster the defects by spatial location within the reticle or die. One example of an application in which such a method would be useful is to isolate lithographic issues that appear at the edge of reticles. Another example of an application in which this method may be useful is to find process problems that occur when the density of the pattern changes such as at the edge of an array. Currently, the only on-tool algorithm that stacks reticles and dies is the algorithm configured to find repeater defects for various purposes such as process window qualification (PWQ). The usage of SSA described herein has previously not been performed. In addition, the method may involve using automatic SSA based die stacking or reticle stacking on a wafer inspection system. The method may also or alternatively involve using automatic SSA based die stacking or reticle stacking on a review system (optical or SEM).

In another embodiment, the results of SSA are used to assign the defects to one or more groups. In this manner, the results of SSA can be used to help shape the review sample. In particular, the SSA results can simplistically be used in the same way as clusters, where clusters are now signatures. In this manner, the system can divide the population into two populations: "signed" and "unsigned" defects for sampling.

In one embodiment, the method includes determining how many of the defects in the one or more groups are to be selected for the defect analysis. In one such embodiment, the results of SSA can be used for sampling such that each signature or distinctive type of signature can be sampled at a specified count or percentage of the population, as is currently performed for clusters. In addition, the number or percentage of defects to be sampled for each signature may be different and determined independently. In this manner, the method can also favor the collection of defects from certain rare or interesting signature types.

In another embodiment, the method includes determining if any of the one or more groups is associated with a known root cause. Because SSA marks signatures by type (signature binning), the system or method can also filter certain signatures for inclusion or exclusion in sampling. In one such example, there may be no value in gathering images of defects that are members of signatures for which the root cause is well understood. In another example, the defects from a single root cause may be sampled more heavily than unsigned defects.

In a further embodiment, the defect(s) in the groups may be an input to the analysis to determine the defects that have the greatest diversity of one or more defect characteristics. Therefore, algorithms for SSA and diverse sampling may be incorporated into a single method that can be performed automatically post-inspection for the purpose of finding more useful samples of defects to revisit to gather images and/or to classify. In one embodiment, the method may involve using a combination of SSA and diverse sampling on an inspection system. In another embodiment, the method may involve using a combination of SSA and diverse sampling on a review system (optical or SEM).

Figure 2:
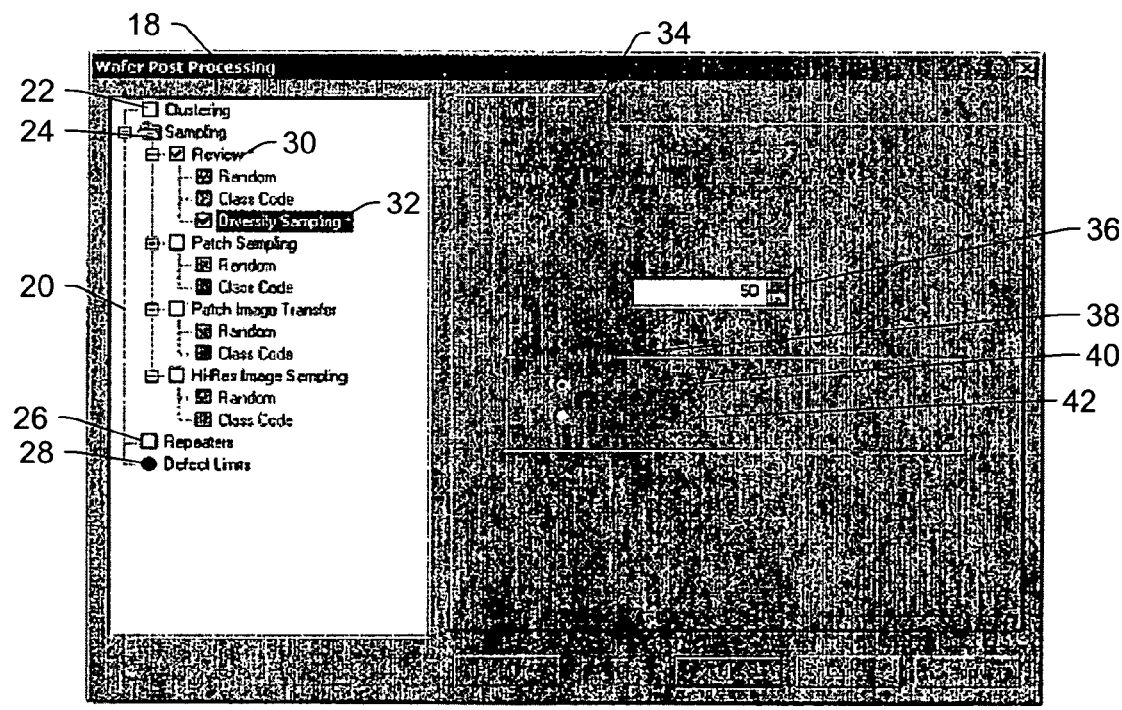
FIG. 2 is a screenshot illustrating one example of a user interface that can be used to select diversity sampling for use in an embodiment of a computer-implemented method described herein.

To use diversity sampling, the user can select diversity sampling and possibly parameters of diversity sampling to be used in the methods described herein. One possible interface that provides this capability is shown in FIG. 2. In particular, FIG. 2 is a screenshot illustrating one example of a user interface that can be used to select diversity sampling for use in an embodiment of a computer-implemented method described herein. As shown in FIG. 2, Wafer Post Processing user interface 18 illustrates a number of options in list 20. In particular, list 20 includes options for Clustering 22, Sampling 24, Repeaters 26, and Defect Limits 28. The Sampling options include Review options 30. As shown in FIG. 2, Review options 30 include Diversity Sampling option 32 as well as other sampling options. The user may select one or more of the sampling options by clicking on the box next to the name of the sampling option.

Upon selection of Diversity Sampling option 32, Diversity Sampling tab 34 may be displayed in user interface 18. The Diversity Sampling tab may display information about and options for diversity sampling. For instance, the Diversity Sampling tab may display information about which types of sampling can be used together. For example, the Diversity Sampling tab may indicate that if Diversity Sampling is selected, other sampling methods such as Random and Class Code sampling will be automatically unselected and vice versa. In addition, Diversity Sampling tab 34 may include Sample Size option 36, in which the user can select the number of defects to be included in the sample. Diversity Sampling tab 34 also includes Sample Within option 38, which allows the user to specify if diversity sampling is to be performed within Each Test 40 or All Tests 42.

The methods described above for selecting defects for defect analysis have many advantages over currently used sampling methods. In particular, the methods described herein provide more effective sampling by handling wafer or die level defect signatures compared to sampling methods based on simple clustering. For example, the methods described herein provide less redundant review of multiple events from the same signature. The methods described herein also allow identification of interesting groups of defects for review not identified by simple clustering such as diffuse area defects or signatures from multiple origins. In addition, the methods described herein allow elimination of well understood defects from sampling, review, and other defect analysis. Furthermore, the methods described herein allow inclusion of a higher number of interesting defects in the review sample. Each of the embodiments of the method for selecting defects for defect analysis described above may include any other step(s) described herein.

One embodiment of a different computer-implemented method for selecting defects for defect analysis includes determining one or more characteristics of defects detected on a specimen. This method also includes selecting the defects having the greatest diversity of the one or more characteristics for defect analysis. Therefore, the method uses diversity sampling as an alternative to random sampling. In one embodiment, the method may involve using automatic diverse sampling on a wafer inspection system. In another embodiment, the method may involve using automatic diverse sampling on a review system (optical or SEM).

The above-described method for selecting defects for defect analysis is advantageous in that it increases the chances of finding interesting defects by identifying a diverse sample of the population automatically. Such a method may be particularly advantageous for sampling in experimental or ramp applications. For example, such a method provides the ability to automatically "see" all of the types of defects on the specimen. In addition, the method provides the ability to avoid instances of similar defects when a defect type predominates on the wafer, but is not apparent as a cluster or signature. For a user to take advantage of an automatically generated diverse sample of defects, the user can select this sampling algorithm from a user interface. One possible interface that can be used to provide this selection to the user is shown in FIG. 2, which may be configured as described above. Each of the embodiments of the method for selecting defects for defect analysis described above may include any other step(s) described herein.

As with inspection, it is preferable to tune the review conditions, both hardware and software, to have optimal performance both in terms of locating the defects and gathering information on them. As with inspection, the optimal conditions for one defect type on the wafer may be substantially different than the conditions for other defect types. In current methods, differences in the optimal conditions may be handled by having recovery strategies such as additional review passes performed with different imaging conditions and algorithms such that the right imaging conditions and algorithms may be used for all of the potential defect types. Foreknowledge of the likely best conditions on a per-defect basis would improve the throughput of SEM review while providing optimal information on every defect. Different sampling conditions as well as different SEM settings could be used on the population sub-samples.

Accordingly, one embodiment of a computer-implemented method for selecting one or more parameters of a defect review process includes determining one or more characteristics of defects selected for defect review. The method also includes selecting one or more parameters of a process for the defect review based on the one or more characteristics such that different types of the defects can be reviewed with one or more different parameters.

In one embodiment, the one or more parameters include one or more data acquisition parameters. In another embodiment, the one or more parameters include one or more data processing parameters. In some embodiments, the method includes selecting one or more sampling parameters for one or more of the defect types based on the one or more characteristics. The sampling parameters may be selected as described further above.

The methods described above for selecting one or more parameters of a defect review process can be used to improve the results of review by tuning the review system to match sub-samples of the defect population. In particular, the method involves using defect data for the purpose of setting up the review hardware and/or software for optimal performance and throughput. For example, the method may bin the defects into two or more different groups for SEM Review, and each group may be reviewed under different hardware and/or software conditions. For instance, defects found on a SEM inspection system could be binned into groups of electrical defects and physical defects. Defects found by an optical inspection system could be binned into embedded and surface defects. This method of SEM control may also include additional methods and steps described herein such as running the inspection multiple times. Because the defects can be reviewed under predetermined optimal conditions, the classifications and images from the SEM Review may be optimal while the SEM review tool is used in a highly efficient manner. Each of the embodiments of the method for selecting one or more parameters of a defect review process may include any other step(s) described herein.

One embodiment of a computer-implemented method for classifying defects includes classifying defects on a specimen using inspection data generated for the specimen combined with defect review data generated for the specimen. In one embodiment, the inspection data includes raw inspection data. In another embodiment, classifying the defects is performed using a defect attributes based method or a feature vector based method. In a different embodiment, classifying the defects includes automatic defect classification. Such defect classification methods may include any appropriate method known in the art.

In one embodiment, the defect review data includes SEM images. In another embodiment, the inspection data used for classifying the defects includes contextual information about the defects. In some embodiments, the inspection data is generated with different data acquisition parameters. In a further embodiment, the defect review data is generated with different data acquisition parameters.

The methods described above, therefore, involve using inspection data combined with review data for the purpose of defect classification. As such, the methods described above can be used to improve the results of review by using inspection information with review information in the automatic classification of defects. In addition, the full (raw) results of the inspection and review processes may considered together for classifying the defects. The algorithm that is used for this binning can be any of the defect attribute based or feature vector based methods known in the art.

The methods described above, therefore, have several advantages over other currently used methods for classifying defects. For instance, although SEM images have the highest currently available image fidelity, there are limitations in the area on the specimen that can be viewed by a SEM. In this manner, the defect data gathered in inspection can provide a greater range of contextual information. In addition, the "signature" of some defects can best be seen or determined by using inspection data generated with different data acquisition or imaging conditions. Furthermore, the SEM images can have limitations in information for some defect types, and the inspection images can provide supplementary information.

Figure 3:
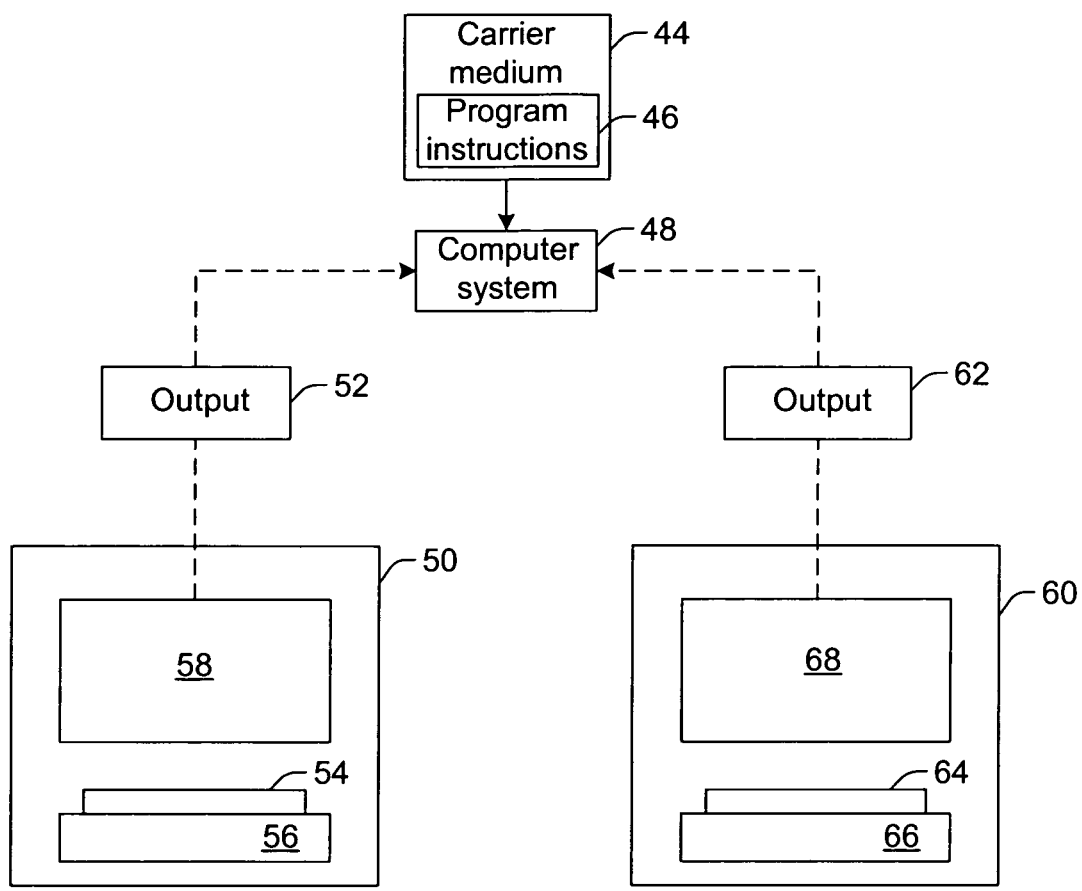
FIG. 3 is a schematic diagram illustrating a side view of one embodiment of a system that can be configured to perform one or more computer-implemented method embodiments described herein.

Another embodiment relates to carrier medium 44 as shown in FIG. 3. It is noted that this figure is not drawn to scale. In particular, the scale of some of the elements of the figure is greatly exaggerated to emphasize characteristics of the elements. Carrier medium 44 includes program instructions 46 executable on computer system 48 for performing one or more of the computer-implemented methods described herein.

Program instructions implementing methods such as those described herein may be transmitted over or stored on the carrier medium. The carrier medium may be a transmission medium such as a wire, cable, or wireless transmission link. The carrier medium may also be a storage medium such as a read-only memory, a random access memory, a magnetic or image acquisition disk, or a magnetic tape.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

The computer system may take various forms, including a personal computer system, mainframe computer system, workstation, image computer, parallel processor, or any other device known in the art. In general, the term "computer system" may be broadly defined to encompass any device having one or more processors, which executes instructions from a memory medium.

FIG. 3 also illustrates one embodiment of a system that can be configured to perform one or more of the computer-implemented method embodiments described herein. The system shown in FIG. 3 includes inspection system 50. Inspection system 50 is configured to generate output 52 that includes inspection data for specimen 54 disposed on stage 56. For example, inspection system 50 includes measurement head 58, which may be arranged with respect to the stage such that optical or other measurements of the specimen may be performed. The stage may include any suitable mechanical or robotic assembly known in the art.

Inspection system 50 may be configured to inspect the specimen using any technique known in the art. In addition, the inspection system may have any suitable configuration known in the art. For example, the inspection system may be configured as an optical inspection system. Alternatively, the inspection system may be configured as an e-beam inspection tool such as a CD SEM and the eS25 and eS30 systems, which are commercially available from KLA-Tencor.

Inspection system 50 is coupled to computer system 48. For example, one or more components (not shown) of measurement head 58 may be coupled to computer system 48 by a transmission medium (not shown). The transmission medium may include "wired" and "wireless" portions. In this manner, output 52 may be transmitted across a transmission medium from measurement head 58 to computer system 48. In some embodiments, the output may also be transmitted through one or more electronic components (not shown) interposed between the measurement head and the computer system. Therefore, output 52 is transmitted from the inspection system to the computer system.

Computer system 48 is configured to perform one or more of the computer-implemented methods described herein using output 52. The computer system may perform these computer-implemented methods and any other defect-related functions using program instructions 46 included in carrier medium 44.

In some embodiments, the system may also or alternatively include defect review system 60. In this manner, the system may or may not include both an inspection system and a defect review system. Such a system may be configured as an inspection/review cluster tool. In other words, the inspection system and the review system may be coupled by one or more common components such as a common environment, a common specimen handler, a common computer system as described further herein, and/or a common power source.

Review system 60 is configured to generate output 62 that includes review data for specimen 64 disposed on stage 66. For example, review system 60 includes measurement head 68, which may be arranged with respect to the stage such that optical or other measurements of the specimen may be performed. The stage may include any suitable mechanical or robotic assembly known in the art.

Review system 60 may be configured to review defects on the specimen using any technique known in the art. In addition, the review system may have any suitable configuration known in the art. For example, the review system may be configured as an optical review system. Alternatively, the review system may be configured as an e-beam review tool such as a CD SEM and the eS25 and eS30 systems, which are commercially available from KLA-Tencor.

Review system 60 is coupled to computer system 48. For example, one or more components (not shown) of measurement head 68 may be coupled to computer system 48 by a transmission medium (not shown). The transmission medium may include "wired" and "wireless" portions. In this manner, output 62 may be transmitted across a transmission medium from measurement head 68 to computer system 48. In some embodiments, the output may also be transmitted through one or more electronic components (not shown) interposed between the measurement head and the computer system. Therefore, output 62 is transmitted from the review system to the computer system.

Computer system 48 is configured to perform one or more of the computer-implemented methods described herein using output 62. The computer system may perform these computer-implemented methods and any other defect-related functions using program instructions 46 included in carrier medium 44.

In some embodiments, the systems described herein may be configured as a "stand alone tool" or a tool that is not physically coupled to a process tool. However, such a system may be coupled to the process tool (not shown) by a transmission medium, which may include wired and wireless portions. The process tool may include any process tool known in the art such as a lithography tool, an etch tool, a deposition tool, a polishing tool, a plating tool, a cleaning tool, or an ion implantation tool. The process tool may be configured as a cluster tool or a number of process modules coupled by a common handler.

The results of the inspection and/or review performed by the systems described herein may be used to alter a parameter of a process or a process tool using a feedback control technique, a feedforward control technique, or an in situ control technique. The parameter of the process or the process tool may be altered manually or automatically.

Further modifications and alternative embodiments of various aspects of the invention may be apparent to those skilled in the art in view of this description. For example, computer-implemented methods for performing one or more defect-related functions are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for identifying noise in inspection data, comprising:
    detecting events in sets of inspection data using detection parameters known to detect noise, nuisance events, and real events, wherein the sets of inspection data are generated by different inspections performed on a specimen in a single inspection process;
    identifying the events detected in a number of the sets of inspection data that is less than a predetermined number as noise;
    determining one characteristic of the real events;
    determining the real events having the greatest diversity of the one characteristic;
    selecting the real events having the greatest diversity of the one characteristic for defect analysis; and
    binning the real events into one or more groups based on proximity of the real events to each other on the specimen and spatial signatures formed by the one or more groups, wherein the binning comprises spatial signature analysis, wherein the spatial signature analysis comprises stacking the inspection data corresponding to multiple areas on the specimen, wherein the multiple areas comprise the same patterned feature design, wherein the spatial signature analysis further comprises determining the proximity of the real events to each other on the specimen and the spatial signatures formed by the one or more groups based on the stacked inspection data, and wherein said detecting, said identifying, said determining the characteristic, said determining the real events, said selecting, and said binning are performed using a computer system.

2. The method of claim 1, further comprising eliminating the events identified as noise from the sets of inspection data.

3. The method of claim 1, wherein the different inspections are performed with the same or different data acquisition conditions.

4. The method of claim 1, wherein the different inspections are performed with the same or different detection parameters.

5. A computer-implemented method for binning defects, comprising:
    determining one characteristic of defects detected in sets of inspection data generated by different inspections performed on a specimen in a single inspection process;
    binning the defects into groups based on the one characteristic, the sets of the inspection data in which the defects were detected, proximity of the defects to each other on the specimen, and spatial signatures formed by the groups, wherein the binning comprises spatial signature analysis, wherein the spatial signature analysis comprises stacking the inspection data corresponding to multiple areas on the specimen, wherein the multiple areas comprise the same patterned feature design, and wherein the spatial signature analysis further comprises determining the proximity of the defects to each other on the specimen and the spatial signatures formed by the groups based on the stacked inspection data;
    determining the defects having the greatest diversity of the one characteristic; and
    selecting the defects having the greatest diversity of the one characteristic for defect analysis, wherein said determining the characteristic, said binning, said determining the defects, and said selecting are performed using a computer system.

6. The method of claim 5, further comprising sampling the defects in the groups for defect review.

7. The method of claim 5, wherein the different inspections are performed with the same data acquisition parameters, and wherein the defects are detected in the sets of inspection data using the same detection parameters.

8. The method of claim 5, wherein the different inspections are performed with different data acquisition parameters.

9. The method of claim 5, wherein the defects are detected in the sets of inspection data using different detection parameters.

10. The method of claim 5, wherein the different inspections are performed with different data acquisition parameters, and wherein the defects are detected in the sets of inspection data using different detection parameters.

11. The method of claim 5, wherein the defects are detected with a single set of inspection parameters, the method further comprising determining additional characteristics of the defects using data generated by an additional inspection performed on the specimen with data acquisition parameters different than data acquisition parameters of the single set.

12. A computer-implemented method for selecting defects for defect analysis on an inspection system, comprising:
    binning defects into one or more groups based on proximity of the defects to each other on a specimen and spatial signatures formed by the one or more groups, wherein said binning comprises spatial signature analysis, wherein the spatial signature analysis comprises stacking inspection data corresponding to multiple areas on the specimen, wherein the multiple areas comprise the same patterned feature design, and wherein the spatial signature analysis further comprises determining the proximity of the defects to each other on the specimen and the spatial signatures formed by the one or more groups based on the stacked inspection data;
    determining one characteristic of the defects detected on the specimen;
    determining the defects having the greatest diversity of the one characteristic;

selecting one or more of the defects in at least one of the one or more groups for defect analysis; and selecting the defects having the greatest diversity of the one characteristic for the defect analysis, wherein said binning, said determining the characteristic, said determining the defects, said selecting the one or more of the defects, and said selecting the defects are performed using a computer system.

13. The method of claim 12, wherein said binning is performed prior to optical review on a review system.

14. The method of claim 12, wherein said binning is performed prior to electron microscope review on a microscope.

15. The method of claim 12, wherein the defect analysis comprises creating a sample for defect review.

16. The method of claim 12, wherein the defect analysis comprises defect classification.

17. The method of claim 12, wherein the defect analysis comprises creating a report on results of said binning.

18. The method of claim 12, further comprising determining how many of the defects in the one or more groups are to be selected for the defect analysis.

19. The method of claim 12, further comprising determining if any of the one or more groups is associated with a known root cause.

20. A computer-implemented method for selecting defects for defect analysis, comprising:
   determining one characteristic of defects detected on a specimen;
   determining the defects having the greatest diversity of the one characteristic;
   selecting the defects having the greatest diversity of the one characteristic for defect analysis; and
   binning the defects into one or more groups based on proximity of the defects to each other on the specimen and spatial signatures formed by the one or more groups, wherein the binning comprises spatial signature analysis, wherein the spatial signature analysis comprises stacking inspection data corresponding to multiple areas on the specimen, wherein the multiple areas comprise the same patterned feature design, wherein the spatial signature analysis further comprises determining the proximity of the defects to each other on the specimen and the spatial signatures formed by the one or more groups based on the stacked inspection data, and wherein said determining the characteristic, said determining the defects, said selecting, and said binning are performed using a computer system.

21. A computer-implemented method for classifying defects, comprising:
   determining one characteristic of defects detected on a specimen;
   determining the defects having the greatest diversity of the one characteristic;
   selecting the defects having the greatest diversity of the one characteristic for defect analysis;
   classifying the defects using inspection data generated for the specimen combined with defect review data generated for the specimen, wherein the inspection data comprises sets of inspection data generated by different inspections performed on the specimen in a single inspection process; and
   binning the defects into one or more groups based on proximity of the defects to each other on the specimen and spatial signatures formed by the one or more groups, wherein the binning comprises spatial signature analysis, wherein the spatial signature analysis comprises stacking the inspection data corresponding to multiple areas on the specimen, wherein the multiple areas comprise the same patterned feature design, wherein the spatial signature analysis further comprises determining the proximity of the defects to each other on the specimen and the spatial signatures formed by the one or more groups based on the stacked inspection data, and wherein said determining the characteristic, said determining the defects, said selecting, said classifying, and said binning are performed using a computer system.

22. The method of claim 21, wherein the inspection data further comprises raw inspection data.

23. The method of claim 21, wherein said classifying is performed using a defect attributes based method or a feature vector based method.

24. The method of claim 21, wherein said classifying comprises automatic defect classification.

25. The method of claim 21, wherein the defect review data comprises scanning electron microscope images.

26. The method of claim 21, wherein the inspection data used for said classifying further comprises contextual information about the defects.

27. The method of claim 21, wherein the inspection data is generated with different data acquisition parameters.

28. The method of claim 21, wherein the defect review data is generated with different data acquisition parameters.

29. The method of claim 1, wherein the single inspection process is a less than optimized inspection process.

30. The method of claim 1, wherein the single inspection process is setup without determining a set of optimal optical inspection parameters for the single inspection process.

31. The method of claim 1, wherein the detection parameters used to detect the events are not optimized.

32. The method of claim 1, wherein the different inspections use non-optimized inspection parameters.

33. The method of claim 1, further comprising determining the events detected in a number of the sets of inspection data that is greater than the predetermined number as the real events.

34. The method of claim 5, wherein binning the defects into the groups based on the one characteristic, the sets of the inspection data in which the defects were detected, the proximity of the defects to each other on the specimen, and the spatial signatures formed by the groups further comprises binning the defects into the groups based on the one characteristic, information for image acquisition conditions used to produce the sets of the inspection data, the proximity of the defects to each other on the specimen, and the spatial signatures formed by the groups.

35. The method of claim 5, wherein data acquisition and processing parameters associated with the sets of inspection data are input to the binning step.

36. The method of claim 12, wherein the spatial signature analysis is part of an inspection recipe performed on the inspection system.

37. The method of claim 12, wherein the multiple areas are fields or dies on the specimen.

38. The method of claim 12, wherein said binning further comprises determining if the defects located in the stacked area form a signature.

39. The method of claim 12, wherein the spatial signature analysis is performed on-tool on the inspection system.

40. The method of claim 12, wherein the spatial signature analysis isolates lithographic issues that appear at edges of reticles.

41. The method of claim 12, wherein the spatial signature analysis identifies process problems that occur when density of a pattern on the specimen changes at an edge of an array.

42. The method of claim 12, wherein the spatial signature analysis is performed by a review system.

43. The method of claim 20, wherein the defects are detected on the specimen in a production run of a wafer inspection system.

44. The method of claim 20, wherein the computer system used to perform said determining the characteristic, said determining the defects, said selecting, and said binning is a computer system of a wafer inspection system.

45. The method of claim 20, wherein the computer system used to perform said determining the characteristic, said determining the defects, said selecting, said binning is a computer system of an optical defect review system.

46. The method of claim 20, wherein the computer system used to perform said determining the characteristic, said determining the defects, said selecting, and said binning is a computer system of a scanning electron microscope defect review system.

* * * * *